US008824673B2

(12) United States Patent
Senda

(10) Patent No.: US 8,824,673 B2
(45) Date of Patent: *Sep. 2, 2014

(54) MACHINE, MACHINE MANAGEMENT APPARATUS, SYSTEM, AND METHOD, AND RECORDING MEDIUM

(71) Applicant: Ricoh Company, Ltd., Ohta-ku (JP)

(72) Inventor: Shigeya Senda, Shizuoka-ken (JP)

(73) Assignee: Ricoh Company, Limited, Ohta-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/682,530

(22) Filed: Nov. 20, 2012

(65) Prior Publication Data

US 2013/0077784 A1    Mar. 28, 2013

Related U.S. Application Data

(63) Continuation of application No. 12/477,215, filed on Jun. 3, 2009, now Pat. No. 8,341,423.

(30) Foreign Application Priority Data

Jun. 4, 2008  (JP) .................................. 2008-147100

(51) Int. Cl.
*H04L 29/06*    (2006.01)
*G06F 21/57*    (2013.01)
*H04L 9/08*    (2006.01)

(52) U.S. Cl.
CPC .............. *H04L 9/0861* (2013.01); *G06F 21/57* (2013.01)
USPC ......................................................... 380/44

(58) Field of Classification Search
USPC ......................................................... 380/44
See application file for complete search history.

(56) References Cited

U.S. PATENT DOCUMENTS 6,233,567 B1 *  5/2001  Cohen ............................. 705/59
6,697,948 B1    2/2004  Rabin et al.

(Continued)

FOREIGN PATENT DOCUMENTS

JP    2004-522330    7/2004
JP    2004-234591    8/2004

(Continued)

OTHER PUBLICATIONS

Japanese Office Action issued Jan. 18, 2013 in Patent Application No. 2008-147100.
Office Action issued Sep. 21, 2012 for Japanese Patent Application No. 2008-147100 filed Jun. 4, 2008.

*Primary Examiner* — Michael S McNally
(74) *Attorney, Agent, or Firm* — Oblon, Spivak, McClelland, Maier & Neustadt, L.L.P.

(57) ABSTRACT

A machine management method includes installing software in a machine including a security device that holds a secret key unextractable from the security device and a public key extractable from the security device, encrypts input data with the public key, and decrypts the input data with the secret key; storing machine identification information of the machine in association with software identification information of the software installed in the machine in an external management apparatus; creating a device-encryption key to encrypt data stored on a first storage device of the machine; storing a device-encryption-key BLOB obtained by encrypting the device-encryption key with the public key on a second storage device of the machine; and storing the device-encryption key in association with the machine identification information in the external management apparatus.

4 Claims, 12 Drawing Sheets

(56) References Cited

U.S. PATENT DOCUMENTS

| | | |
|---|---|---|
| 2003/0188181 A1 | 10/2003 | Kunitz et al. |
| 2004/0133803 A1* | 7/2004 | Rabin et al. ............. 713/200 |
| 2006/0090070 A1* | 4/2006 | Bade et al. ............. 713/164 |
| 2006/0168580 A1* | 7/2006 | Harada et al. ............. 717/174 |
| 2009/0037749 A1 | 2/2009 | Jeansonne et al. |

FOREIGN PATENT DOCUMENTS

| | | |
|---|---|---|
| JP | 2005-84989 | 3/2005 |
| JP | 2007-148492 A | 6/2007 |
| JP | 2008-226159 | 9/2008 |
| JP | 2008-234217 | 10/2008 |

* cited by examiner

| MACHINE-SPECIFIC ID | FIRMWARE IDENTIFIER | FIRMWARE VERSION |
|---|---|---|
| 123456 | MAIN-UNIT SYSTEM | 123456 |
| 123456 | PRINT PROGRAM | 654321 |
| . . . . . . . . . . | | |

| MACHINE-SPECIFIC ID | DEVICE TYPE | DEVICE ID | DEVICE ENCRYPTION KEY | PASSPHRASE |
|---|---|---|---|---|
| 123456 | HDD | 123456 | ????? | XXXXX |
| 123456 | NVRAM | 654321 | ????? | XXXXX |
| . . . . . . . . . . . | | | | |

MACHINE, MACHINE MANAGEMENT APPARATUS, SYSTEM, AND METHOD, AND RECORDING MEDIUM

CROSS-REFERENCE TO RELATED APPLICATIONS

This application is a continuation application of U.S. application Ser. No. 12/477,215, filed Jun. 3, 2009, which claims priority pursuant to 35 U.S.C. §119 from Japanese Patent Application No. 2008-147100, filed on Jun. 4, 2008 in the Japan Patent Office. The entire contents of the above-identified applications are incorporated herein by reference.

BACKGROUND OF THE INVENTION

1. Field of the Invention

Illustrative embodiments of the present invention relate to a machine in which software and a device-encryption key are installed, an apparatus, system, and method for managing the software and the device-encryption key installed in the machine, and a recording medium including instructions for causing the apparatus to execute the method.

2. Description of the Background

Conventionally, hash values are used to detect unauthorized modification of software installed in a computer. When software is installed in a computer, a first hash value for the software is calculated and stored on a secondary storage device of the computer. Further, at start-up, the computer calculates a second hash value for the software when loading it, compares the second hash value with the first hash value stored on the secondary storage device, and determines whether unauthorized modification has been performed on the software based on results of the comparison.

In such a conventional detection method, however, if unauthorized modification is performed on both the software and the first hash value stored on the secondary storage device, the computer cannot detect the unauthorized modification.

It is conceivable that encrypting the first hash value stored on the secondary storage device may circumvent this problem of failing to detect unauthorized modification of the software. However, since an encryption/decryption key for encrypting and decrypting the hash value is stored on the secondary storage device as well, an unauthorized user can obtain the decryption key to decrypt the encrypted hash value.

Hence, a conventional method proposes detecting unauthorized modification of firmware using a trusted platform module (TPM). A TPM is a security chip that conforms to standards defined by TCG (trusted computing group), an industry standard-setting organization, and includes a non-volatile memory storing an asymmetrical key pair consisting of an unextractable secret key and an extractable public key and a micro-processor for encryption processing, which are installed, for example, on a mother board of a MFP (multi-functional peripheral).

In the conventional method, an encryption key (hereinafter "key BLOB (binary large object)") encrypted with the public key of the asymmetrical key pair is stored on a secondary storage device, such as the non-volatile memory, of the MFP. When firmware is installed in the MFP before shipment, a hash value is calculated. When the encryption key is decrypted from the key BLOB using the TPM, the hash value is encrypted with the decrypted encryption key and stored on an external secondary storage device, such as an SD (secure digital) memory card. In setting up the MFP, the key BLOB loaded from the internal secondary storage device is decrypted using the TPM, and the encrypted hash value loaded from the external secondary storage device is decrypted with the encryption key decrypted from the key BLOB. The decrypted hash value is compared with a hash value re-calculated from the firmware. As a result, if the decrypted hash value matches the re-calculated hash value, the MFP determines that no unauthorized modification has been performed. By contrast, if the decrypted hash value differs from the re-calculated hash value, the MFP determines that unauthorized modification has been performed. Thus, the conventional method detects unauthorized modification of the firmware during delivery of the MFP.

However, in the conventional method, since the detection of unauthorized modification is performed within the MFP, when unauthorized modification is performed on, for example, software for determining a comparison result, the MFP cannot detect unauthorized modification of the firmware.

In another example, to prevent tapping of internally-stored data, information stored on a storage device, such as a hard disk drive (HDD), of a machine may be encrypted. Alternatively, it is conceivable that a device-encryption key for encrypting data stored on a storage device of a machine is encrypted with a public key of an asymmetrical key pair of a TPM to create a key BLOB, which is stored on a non-volatile memory of the machine.

However, when a board mounting the TPM malfunctions, the machine cannot decrypt the device-encryption key. Consequently, even when a storage device, such as an HDD, of the machine is operating normally, the encrypted data stored on the storage device cannot be accessed.

Alternatively, the above-described problem might be prevented if a user can store or back up the key BLOB in some way. In such a case, however, from the viewpoint of security, a user needs to back up a device-encryption key whenever changing it. Such a configuration poses much trouble to users and additionally, depending on the management method, may actually increase the risk of a security breach in the form of leaks of information about the device-encryption key.

SUMMARY OF THE INVENTION

The present disclosure provides an apparatus, system, and method for detecting unauthorized modification of software installed in a machine and managing a device-encryption key for encrypting data stored on a storage device of the machine.

In one illustrative embodiment, a machine management method includes installing software in a machine including a security device that holds a secret key unextractable from the security device and a public key extractable from the security device, encrypts input data with the public key, and decrypts the input data with the secret key; storing machine identification information of the machine in association with software identification information of the software installed in the machine in an external management apparatus; creating a device-encryption key to encrypt data stored on a first storage device of the machine; storing a device-encryption-key BLOB obtained by encrypting the device-encryption key with the public key on a second storage device of the machine; and storing the device-encryption key in association with the machine identification information in the external management apparatus.

In another illustrative embodiment, a machine management apparatus manages software installed in a machine and a device-encryption key to encrypt data stored on a first storage device of the machine. The machine includes a security device that holds a secret key unextractable from the security device and a public key extractable from the security device, encrypts input data with the public key, and decrypts the input data with the secret key. The apparatus includes a storage device to store machine identification information of the machine in association with software identification information of the software when the software is installed in the machine and the device-encryption key in association with the machine identification information when the device-encryption key is created.

In still another illustrative embodiment, a machine management system includes a machine and a machine management apparatus. The machine includes a first storage device to store data and a security device to hold a secret key unextractable from the security device and a public key extractable from the security device, encrypt input data with the public key, and decrypt the input data with the secret key. The machine management apparatus manages software installed in the machine and a device-encryption key to encrypt data stored on the first storage device of the machine. The machine management apparatus includes a storage device to store machine identification information of the machine in association with software identification information of the software when the software is installed in the machine and the device-encryption key in association with the machine identification information when the device-encryption key is created.

BRIEF DESCRIPTION OF THE DRAWINGS

A more complete appreciation of the disclosure and many of the attendant advantages thereof will be readily acquired as the same becomes better understood by reference to the following detailed description when considered in connection with the accompanying drawings, wherein.

Figure 1:
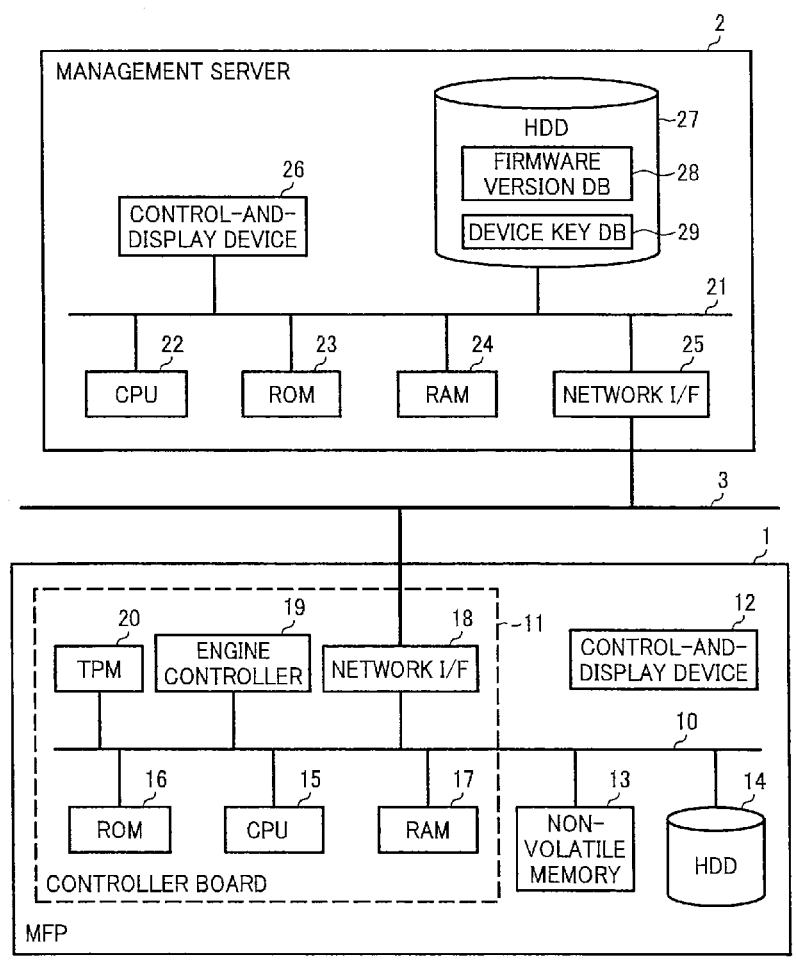
FIG. 1 is a schematic view illustrating a configuration of a machine management system according to an illustrative embodiment of the present disclosure.

The accompanying drawings are intended to depict illustrative embodiments of the present disclosure and should not be interpreted to limit the scope thereof. The accompanying drawings are not to be considered as drawn to scale unless explicitly noted.

DETAILED DESCRIPTION OF ILLUSTRATIVE EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the illustrative embodiments are described with technical limitations with reference to the attached drawings, such description is not intended to limit the scope of the present invention and all of the components or elements described in the illustrative embodiments of this disclosure are not necessarily indispensable to the present invention.

In this disclosure, the phrase "creating a device-encryption key" represents creating a new device-encryption key or modifying (updating) an existing device-encryption key.

Below, an illustrative embodiment of the present disclosure is described with reference to the drawings. In the present illustrative embodiment, a multi-functional peripheral (MFP) 1 having multiple capabilities, such as that of a copier, a facsimile machine, a printer, and a scanner, is described as an example of a machine in which software and a device-encryption key are installed. However, it is to be noted that the machine is not limited to the MFP and may be other type of image forming apparatus or any other suitable machine.

As illustrated in FIG. 1, in a machine management system according to the present illustrative embodiment, the MFP 1 is connected to a management server 2 to communicate with each other via a network 3.

The MFP 1 includes a bus 10, a controller board 11, a control-and-display unit 12, a non-volatile memory 13, and a hard disk drive (HDD) 14, all of which are connected to the bus 10. The control-and-display unit 12 includes a plurality of different types of control keys and a liquid crystal display (LCD). The non-volatile memory 13 is, for example, a non-volatile random access memory (NVRAM) or a ferric RAM (FRAM) capable of holding a variety of different types of data while the power is turned OFF.

The controller board 11 includes a central processing unit (CPU) 15, a read only memory (ROM) 16, a RAM 17, a network interface (I/F) 18, an engine controller 19, and a trusted platform module (TPM) 20, all of which are connected via the bus 10.

The CPU 15 controls the entire MFP 1. The ROM 16 is, for example, an inverted AND (NAND) or inverted OR (NOR) flash memory on which firmware such as a basic input/output system (BIOS), an operating system (OS), and programs are loaded. The RAM 17, when the CPU 15 is in operation, serves as a work area in which programs and data are temporarily stored. The network I/F 18 is an interface connecting the MFP 1 to the network 3. The engine controller 19 controls, for example, a printer engine and a scanner engine.

Figure 2:
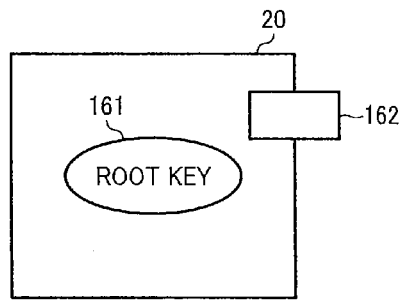
FIG. 2 is a schematic view illustrating a configuration of a TPM.

As illustrated in FIG. 2, the TPM 20 includes a root key 161 and a bidirectional communication interface 162. The root key 161 is an asymmetrical key pair consisting of a secret key (decryption key) not extractable from the TPM 20 and a public key (encryption key) extractable from the TPM 20. The bidirectional communication interface 162 encrypts input plain text data with the public key of the root key 161 to output the encrypted data and decrypts the encrypted data with the secret key of the root key 161 to output the decrypted data. Below, such encryption with the public key of the root key 161 and decryption with the secret key of the root key 161 are referred to as "encryption with the root key 161" and "decryption with the root key 161", respectively, for simplicity. The TPM 20 is fixedly mounted on the controller board 11 and cannot be removed for use in another controller board.

Figure 3:
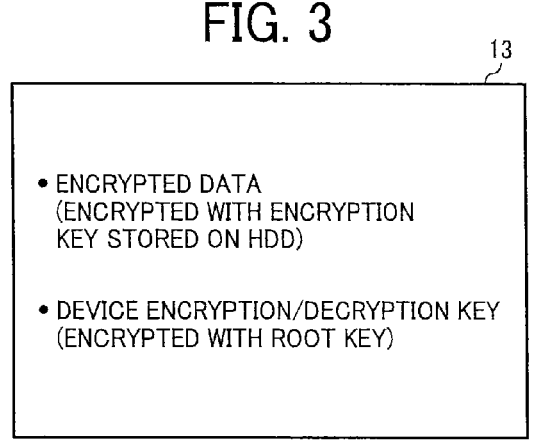
FIG. 3 is a diagram illustrating a storage device storing encrypted data and a device encryption/decryption key.

As illustrated in FIG. 3, in the non-volatile memory 13, a device encryption key/decryption key (device-encryption-key BLOB) is stored in a non-encrypted area. The data stored in an encrypted area of the non-volatile memory 13 is data encrypted with the device encryption key/decryption key. When the encrypted data is loaded, the encrypted data is decrypted with the device encryption key/decryption key and made available. Both the device-encryption key for encrypting data to be stored in the HDD 14 and the device-decryption key for decrypting such encrypted data are stored in the non-volatile memory 13 as a device-encryption-key BLOB.

In FIG. 1, the management server 2 includes a bus 21, and a CPU 22, a ROM 23, a RAM 24, a network I/F 25, a control-and-display unit 26, and an HDD 27, all of which are connected via the bus 21. The components act similarly to the corresponding components of the above-described MFP 1. For example, a firmware version database (DB) 28 to store version information of firmware written on the non-volatile memory 13 of the MFP 1 and a device key DB 29 to store device keys, such as the device encryption key/decryption key of the HDD 14 of the MFP 1, are created and stored on the HDD 27.

In the machine management system having such a configuration, when the MFP 1 is shipped from the factory, the TPM 20 is initialized to create an asymmetrical key (endorsement key) pair, which is the above-described root key 161. The public key of the asymmetrical key pair is used as machine-specific identification (ID) information by itself or in combination with unique identification information, such as a model number or a production number of the controller board 11. The management server 2 supplies a communication key (hereinafter, "default-setting communication key") used for a certain type of communication with the management server 2. The MFP 1 encrypts the default-setting communication key with the root key 161 to create the communication key BLOB and stores the communication key BLOB in the non-volatile memory 13 or an NVRAM of the TPM 20.

Figure 4:
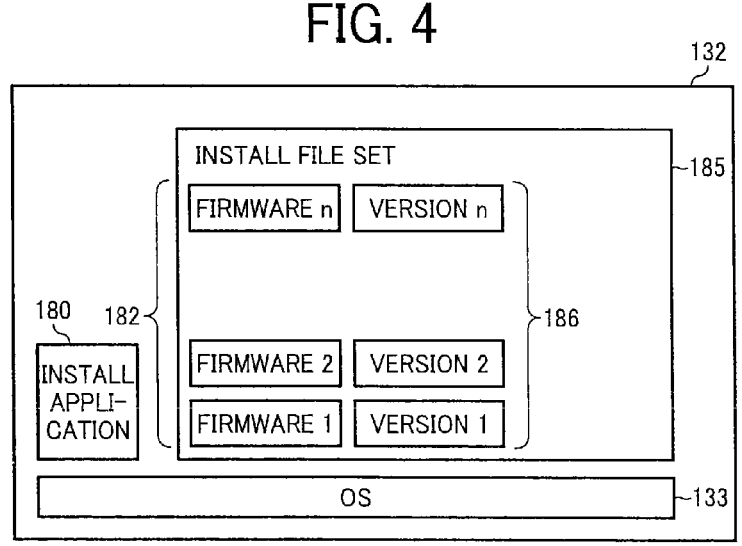
FIG. 4 is a schematic diagram illustrating a configuration of software to install firmware in a MFP.

When the initialization of the TPM 20 is finished, firmware is installed into the MFP 1. FIG. 4 illustrates an example of software for installing the firmware into the MFP 1. The software is configured as a platform 132 including an OS 133, an install application 180, and an install-file set 185. The install-file set 185 includes a firmware set 182 and a version-file set 186. Version files 1 to n of the version-file set 186 are text files of character strings representing version information of corresponding firmware 1 to n of the firmware set 182. The install application 180 and the install-file set 185 are supplied from the management server 2 via the network 3 or loaded from a device for reading (reproducing) a recording medium, on which the install application 180 or the install-file set 182 is recorded, connected to the MFP 1.

Figure 5:
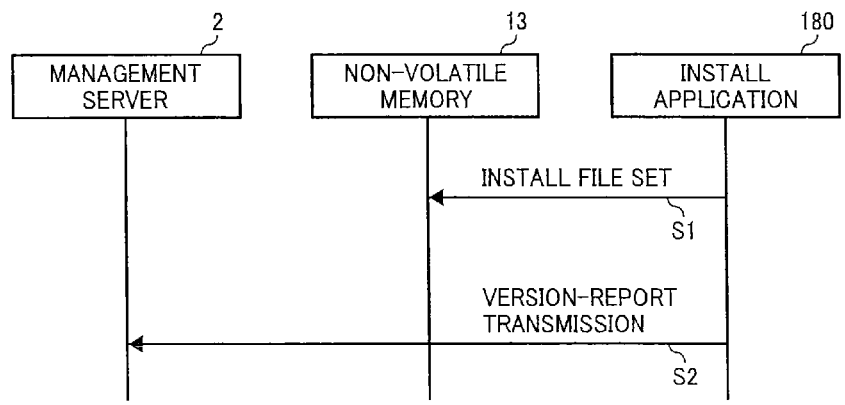
FIG. 5 is a sequence diagram illustrating operations performed when installing firmware into the MFP.

FIG. 5 is a sequence diagram illustrating installation of the firmware in the MFP 1. At S1, the install application 180 installs the install-file set 185 including the firmware set 182 and the version-file set 186 into the ROM 16 and the HDD 14. At S2, the install application 180 transmits a version report to the management server 2.

Figure 6:
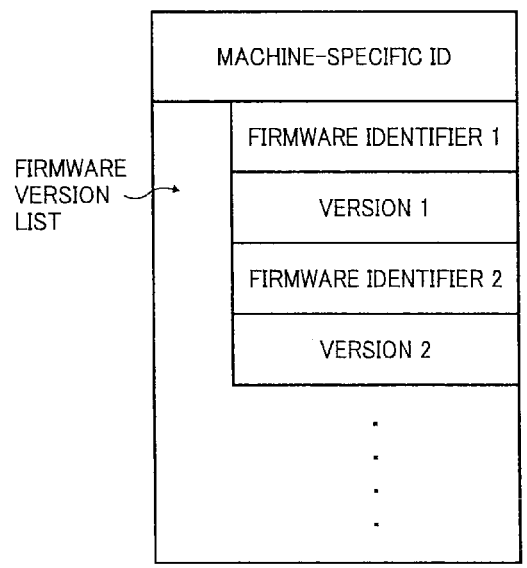
FIG. 6 is a diagram illustrating an example of a version report.

As illustrated in FIG. 6, the version report includes machine-specific ID information and a firmware-version list. The firmware-version list corresponds to the version-file set 186 illustrated in FIG. 5 and includes firmware identifiers and version information.

Figures 7, 8:
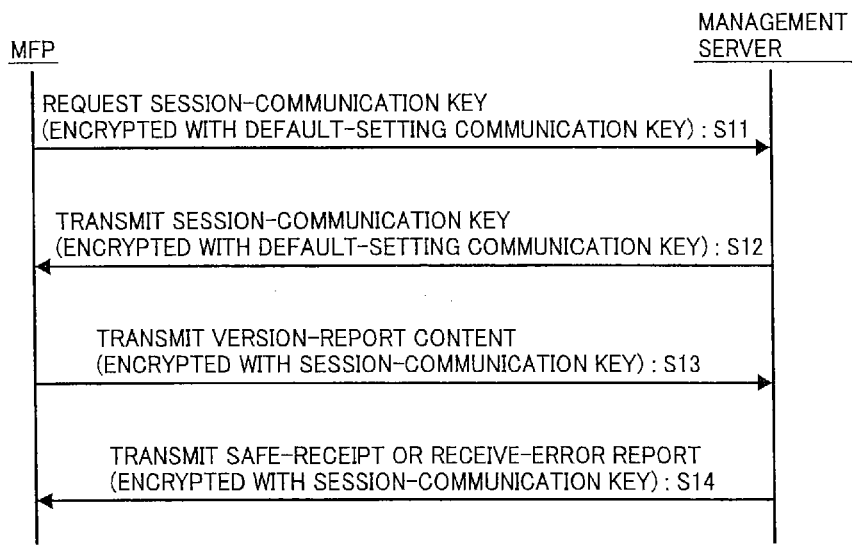
FIG. 7 is a sequence diagram illustrating a detailed transmission process of the version report illustrated in FIG. 5.
FIG. 8 is a diagram illustrating an example of a firmware-version DB.

FIG. 7 is a sequence diagram illustrating in detail the procedure of S2 illustrated in FIG. 5.

At S11, the MFP 1 sends a signal for requesting the management server 2 to transmit a session-communication key. The request signal for session-communication key is encrypted with a default-setting communication key obtained by decrypting the communication key BLOB stored on the controller board 11 at the initialization of the TPM 20.

The management server 2 receives the request signal for session-communication key and decrypts the request signal with the default-setting communication key stored therein. At S12, the management server 2 transmits the session-communication key encrypted with the default-setting communication key to the MFP 1.

The MFP 1 receives the encrypted session-communication key and decrypts it with the default-setting communication key to obtain the session-communication key. At S13, the MFP 1 transmits a version report encrypted with the session-communication key to the management server 2.

The management server 2 receives the encrypted version report and decrypts it with the session-communication key. Thus, when obtaining the version report, the management server 2 stores it in the firmware version DB 28 of the HDD 27. FIG. 8 illustrates an example of the firmware version DB 28.

When the version report is normally obtained and stored, at S14 the management server 2 transmits a safe-receipt report to the MFP 1. By contrast, when the version report is not normally obtained and stored, at S14 the management server 2 transmits a receive-error report to the MFP 1. Both the safe-receipt report and the receive-error report are encrypted with the session-communication key.

As described above, the before-shipment processing of the MFP 1 is performed. Next, a description is given of processing performed when the MFP 1 is set up at a destination and the HDD 14 serving as a storage device is encrypted.

Figure 9:
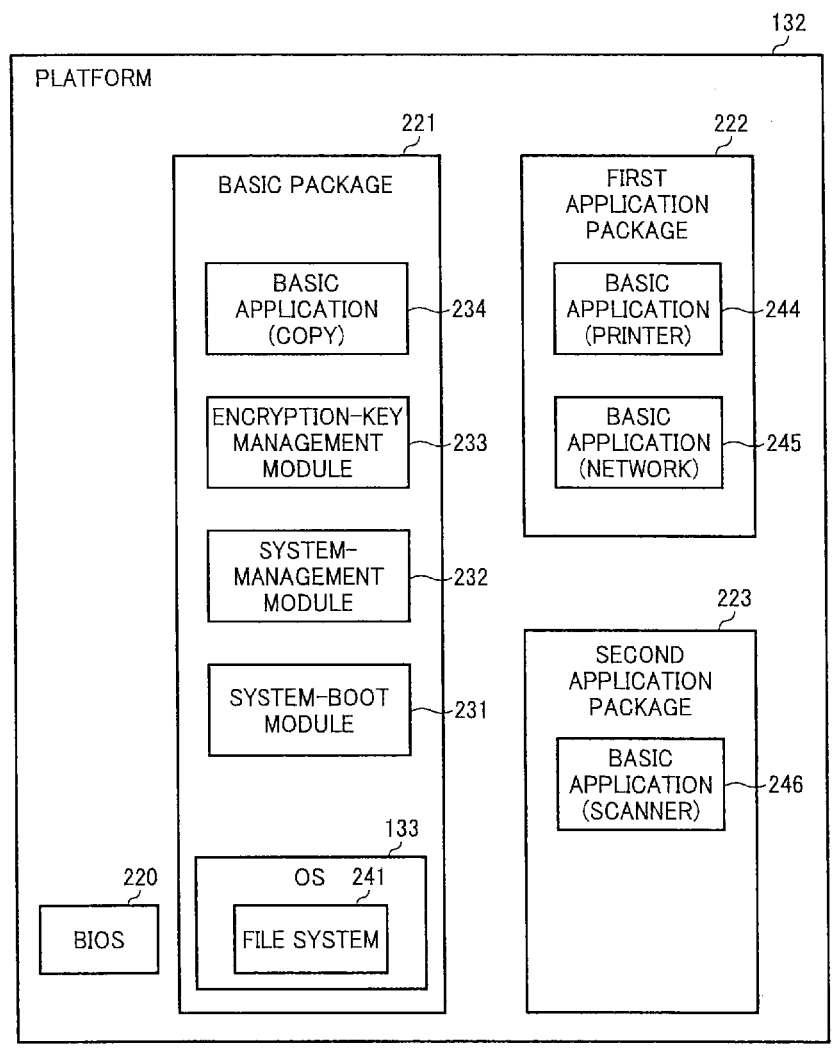
FIG. 9 is a diagram illustrating an example of software for processing a device-encryption key when booting the MFP.

FIG. 9 illustrates one example of software for processing a device-encryption key when booting the MFP 1 out of a variety of different types of software. The software includes a BIOS 220, a basic package 221, a first application package 222, and a second application package 223. Such a set of software is pre-installed before shipment. For example, the BIOS 220 is stored in the ROM 16 and other firmware is installed in the ROM 16 and the HDD 14.

In FIG. 9, the basic package 221 includes an OS 133, a system boot module 231, a system management module 232, an encryption-key management module 233, and a basic application (copy) 234. The first application package 222 includes a basic application (printer) 244 and a basic application (network) 245. The second application package 223 includes a basic application (scanner) 246.

The BIOS 220 is a module in charge of an initial stage of system boot and accesses the TPM 20. The OS 133 allows other software modules to use hardware functions. A file system 241 of the OS 133 performs data management.

At start-up of the MFP 1, the BIOS 220 boots the OS 133. After the OS 133 is booted, the system boot module 231 is started to boot other software except the OS 133 in a certain order. The CPU 15 causes the BIOS 220, the OS 133, the file system 241, and other modules to be loaded in the RAM 17 for execution.

Here, the encryption and decryption of information using the TPM 20 are described.

Figure 10:
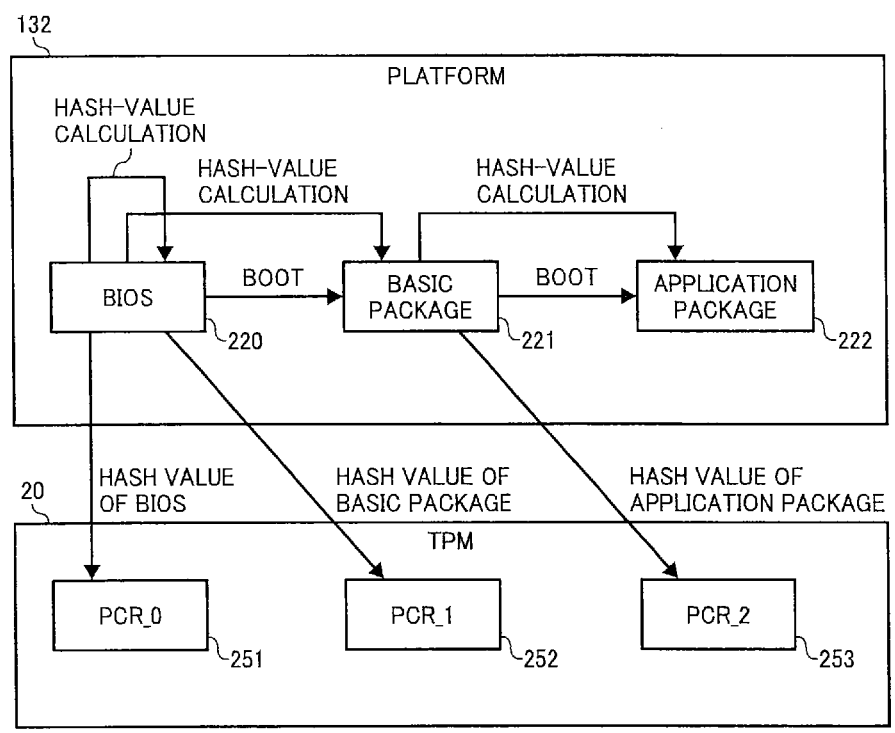
FIG. 10 is a diagram illustrating operation of the TPM in booting the MFP.

FIG. 10 illustrates operation of the TPM 20 performed in booting the MFP 1. In the platform 132, the BIOS 220 calculates a hash value thereof and registers it in a PCR (platform configuration register) 251 (PCR_0 251) of the TPM 20. In calculating the hash value, the BIOS 220 uses a computing method to generate pseudo-random numbers of a fixed length from, for example, an original sentence.

Next, the BIOS 220 calculates a hash value of the basic package 221, registers it in a PCR (PCR_1) 252 of the TPM 20, and boots the basic package 221. The basic package 221 in turn calculates a hash value of the first application package 222, registers it in a PCR (PCR_2) 253 of the TPM 20, and boots the first application package 222.

As described above, in booting the MFP 1, the hash values calculated from the BIOS 220, the basic package 221, and the first application package 222 are registered in the PCRs 251, 252, and 253 of the TPM 20.

Figure 11A:
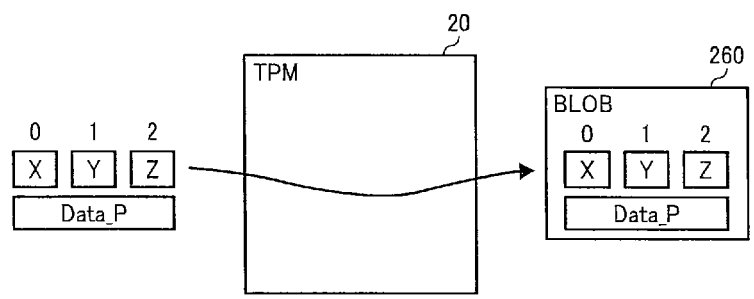
FIG. 11A is a diagram illustrating an example of encryption of information using the TPM.
Figure 11B:
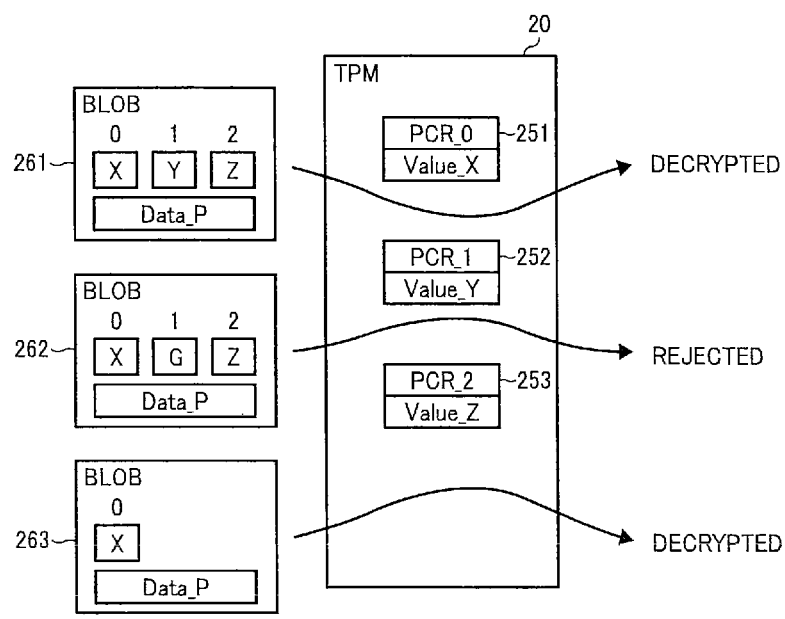
FIG. 11B is a diagram illustrating an example of decryption of encrypted information using the TPM.

FIGS. 11A and 11B illustrate encryption and decryption of information using the TPM 20. FIG. 11A illustrates encryption of information "Data_P" using the TPM 20. The TPM 20 creates a BLOB 260 based on the Data_P, an encryption target, and hash values X to Z stored in the PCR_0 to PCR_2.

FIG. 11B illustrates decryption of BLOBs 261 to 263 using the TPM 20. In the TPM 20, for example, three hash values X, Y, and Z calculated from the BIOS 220, the basic package 221, and the first application package 222 are registered in the PCR_0 251, the PCR_1 252, and the PCR_2 253 in booting the MFP 1.

The BLOBs 261 to 263 including Data_P are managed by the file system 241. In the BLOB 261, hash values X, Y, and Z are registered in a PCR_0, a PCR_1, and a PCR_2, respectively. In the BLOB 262, hash values X, G, and Z are registered in a PCR_0, a PCR_1, and a PCR_2, respectively. In the BLOB 263, a hash value X is registered in a PCR_0.

In FIG. 11B, since the hash values X, Y, and Z registered in the PCR_0 to the PCR_2 of the BLOB 261 are identical to the hash values X, Y, and Z registered in the PCR_0 to the PCR_2 of the TPM 20, the TPM 20 allows extraction of the Data_P from the BLOB 261. By contrast, since the hash value G registered in the PCR_1 of the BLOB 262 differs from the hash value Y registered in the PCR_1 of the TPM 20, the TPM 20 rejects extraction of the Data_P from the BLOB 262. In the BLOB 263, the hash value X registered in the PCR_0 of the BLOB 263 is identical to the hash value X registered in the PCR_0 of the TPM 20, the TPM 20 allows extraction of the Data_P from the BLOB 263. In a PCR, such as the PCR_1 and PCR_2 of the BLOB 263, in which a hash value is not registered, the TPM 20 does not use such a condition to determine whether to allow or reject extraction of Data_P.

Figure 12:
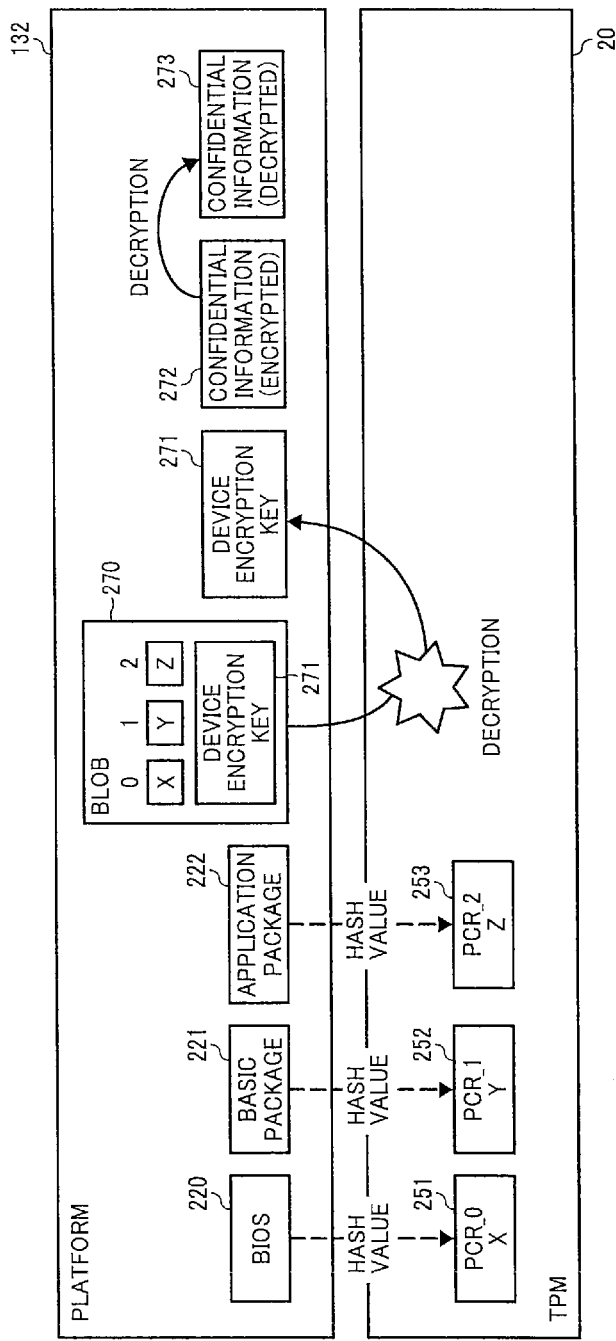
FIG. 12 is a diagram illustrating processing for acquiring a device-encryption key in booting the MFP.

FIG. 12 illustrates processing for acquiring a device-encryption key 271 in booting the MFP 1. A BLOB (device-encryption-key BLOB) 270 obtained by encrypting the device-encryption key 271 with a root key 161 is pre-stored in the file system 241 in the platform 132 of the MFP 1, for example, before shipment. Whether to allow or reject decryption of the device-encryption-key BLOB 270 is determined using hash values registered in PCRs 251 to 253. The device-encryption key 271 is used to encrypt confidential information set in the file system 241 or decrypt encrypted confidential information.

In the TPM 20, at start-up of the MFP 1, three hash values X to Z calculated from the BIOS 220, the basic package 221, and the first application package 222 are registered in the PCR_0 to the PCR_2.

In the device-encryption-key BLOB 270, hash values X to Z are registered in a PCR_0 to a PCR_2. In FIG. 12, since the hash values registered in the PCR_0 to the PCR_2 of the device-encryption-key BLOB 270 are identical to the hash values registered in the PCR_0 to the PCR_2 of the TPM 20, the TPM 20 decrypts (extracts) the device-encryption key 271 from the device-encryption-key BLOB 270. Thus, the encryption-key-management module 233 uses the device-encryption key 271 to decrypt confidential information 273 from encrypted confidential information 272.

Figure 13:
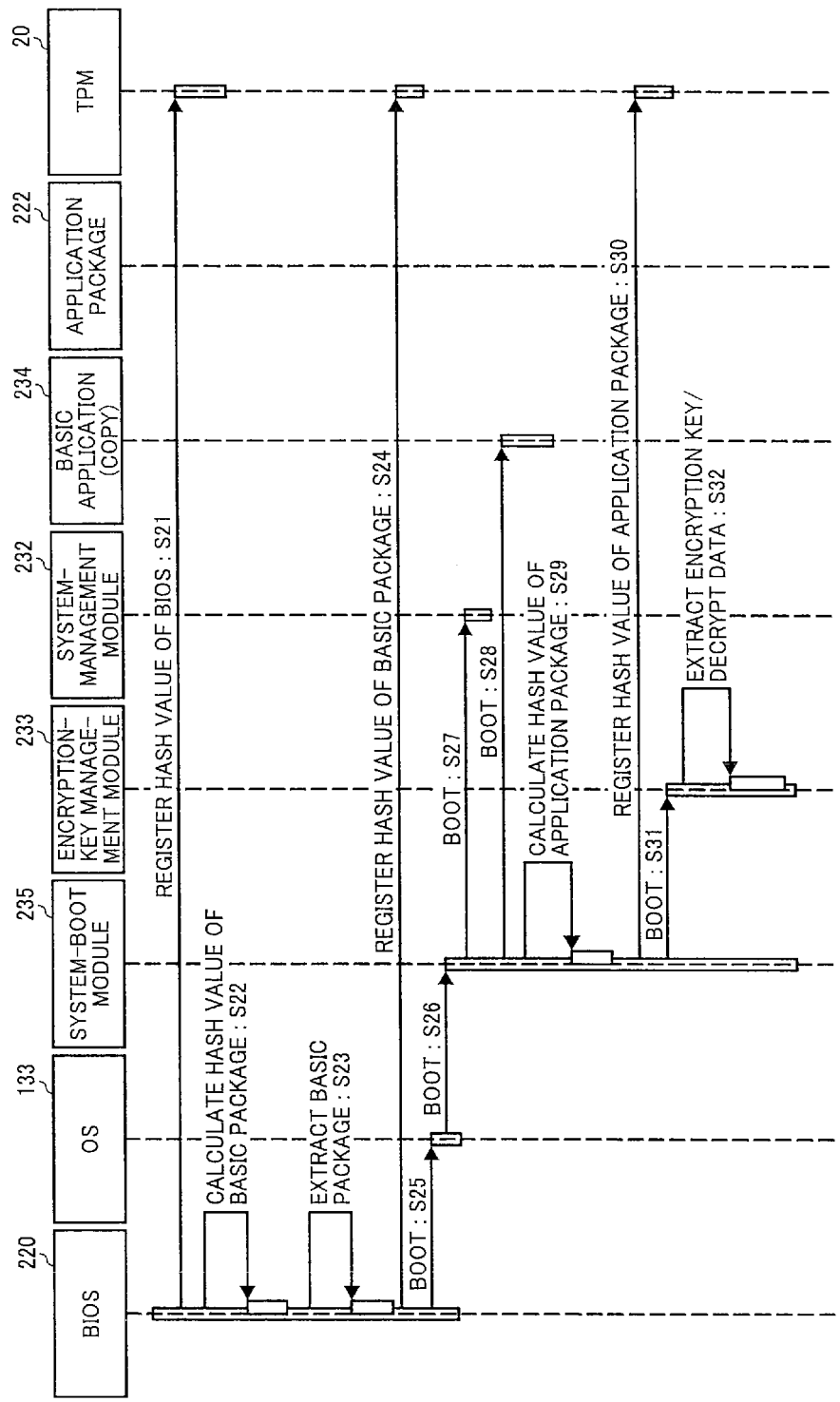
FIG. 13 is a sequence diagram illustrating processing for acquiring a device-encryption key in booting the MFP.

FIG. 13 is a sequence diagram illustrating processing for acquiring a device-encryption key in booting the MFP 1.

At S21, the BIOS 220 calculates a hash value thereof and registers it in the PCR 251 of the TPM 20. At S22, the BIOS 220 calculates a hash value of the basic package 221. At S23, the BIOS 220 extracts the basic package 221. At S24, the BIOS 220 registers the hash value of the basic package 221 in the PCR 252 of the TPM 20. At S25, the BIOS 220 boots the OS 133.

At S26, the OS 133 boots the system boot module 235. At S27, the system boot module 235 boots the system management module 232. At S28, the system boot module 235 boots the basic application (copy) 234.

At S29, the system boot module 235 calculates a hash value of the application package 222. At 530, the system boot module 235 registers the hash value of the application package 222 in the PCR 253 of the TPM 20.

At S31, the system boot module 235 boots the encryption-key management module 233. At S32, as described above, the encryption-key management module 233 decrypts (extracts) the device-encryption key 271 from the device-encryption-key BLOB 270. The encryption-key management module 233 uses the device-encryption key 271 to decrypt confidential information from the encrypted confidential information 272.

After the hash values calculated from the BIOS 220, the basic package 221, and the application package 222 are registered in the PCRs 251 to 253, the TPM 20 accepts decryption of the device-encryption-key BLOB 270. When the TPM 20 is ready for accepting decryption of the device-encryption-key BLOB 270, the encryption-key management module 233 requests the decryption of the device-encryption-key BLOB 270 to the TPM 20. Thus, the encryption-key management module 233 acquires the device-encryption key 271 which the TPM 20 has decrypted from the device-encryption-key BLOB 270.

As described above, the acquired device-encryption key 271 is used to encrypt data stored on the HDD 14 and decrypt the encrypted data stored on the HDD 14. When the device-encryption key 271 is updated or the HDD 14 is initialized with a new device-encryption key, the MFP 1 transmits a key report to the management server 2 according to a process sequence illustrated in FIG. 14. Such key-report transmission is also performed when a new device-encryption key is created before shipment or at setup of the MFP 1.

Figure 14:
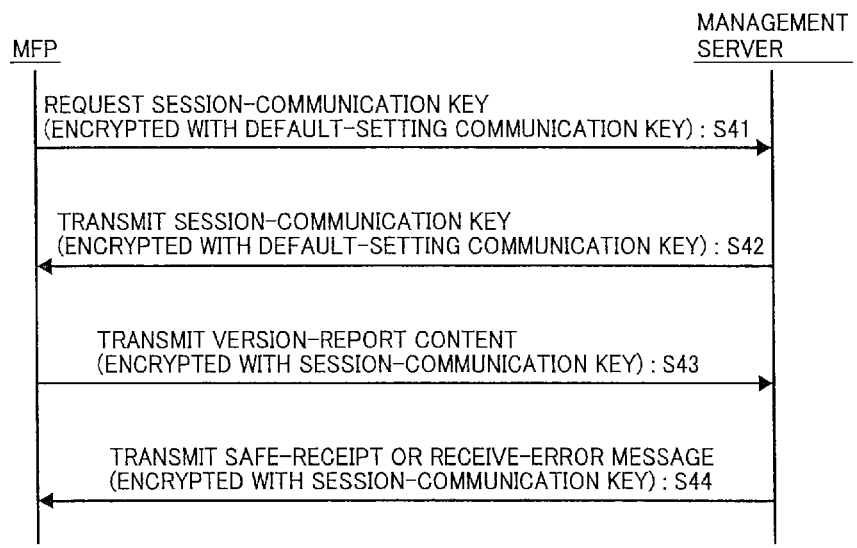
FIG. 14 is a sequence diagram illustrating processing for transmitting a key report.

In the sequence illustrated in FIG. 14, steps S41 and S42 are performed in the manner identical to the above-described steps S11 and S12 illustrated in FIG. 7. At S43, the MFP 1 transmits a key report encrypted with a session-communication key to the management server 2.

Figure 15:
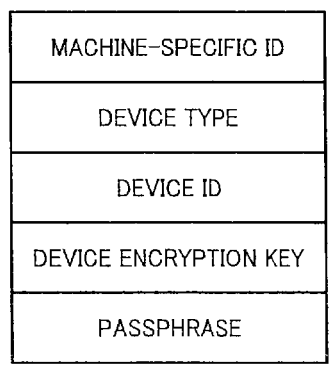
FIG. 15 is a diagram illustrating an example of the key report.

As illustrated in FIG. 15, the key report includes machine-specific ID information, a device type (for example, HDD), device ID information (for example, ID information obtained using an ATA (AT Attachment) command in the case of HDD), a device-encryption key, and a passphrase input from the control-and-display unit 12 by a system administrator.

Figures 16, 17:
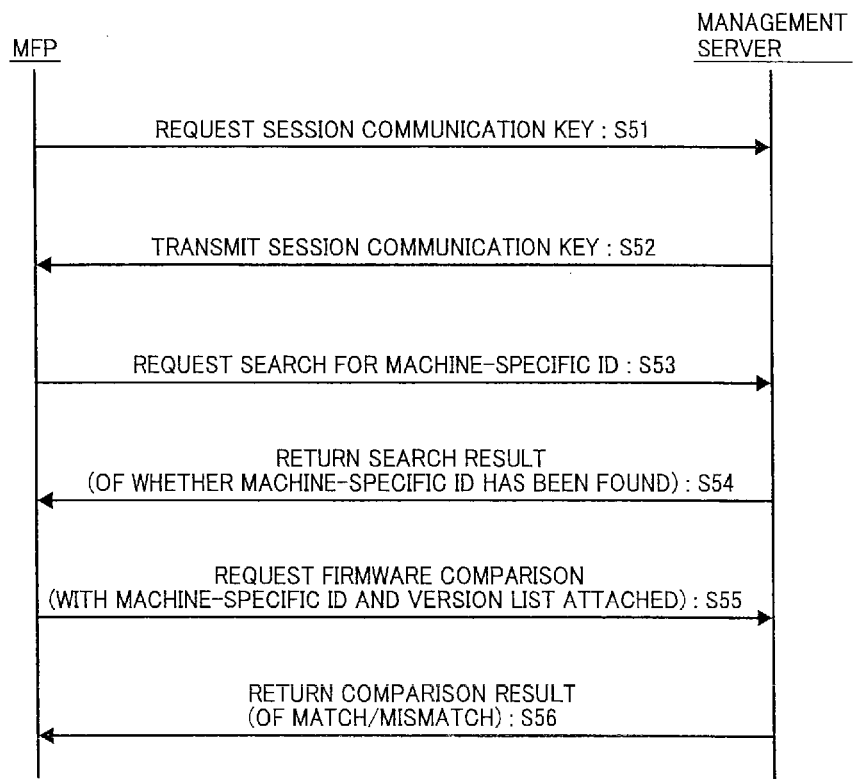
FIG. 16 is a diagram illustrating an example of a device-key DB.
FIG. 17 is a sequence diagram illustrating processing for detecting unauthorized modification of firmware installed before shipment.

The management server 2 receives the encrypted key report, decrypts the encrypted key report with the session-communication key, obtains the key report, and stores the key report on a device-key DB 29. FIG. 16 illustrates an example of the device-key DB 29.

If the management server 2 normally obtains and stores the key report, at S44 the management server 2 transmits a safe-receipt report to the MFP 1. By contrast, if the management server 2 cannot normally obtain the key report, at S44 the management server 2 transmits a receive-error report to the MFP 1. Both the safe-receipt report and the receive-error report are encrypted with the session-communication key.

Next, the process of detecting unauthorized modification of firmware installed before shipment is described with reference to FIG. 17. The process detects whether unauthorized modification has been performed on firmware during a period from shipment to setup, that is, during transportation.

At S51, the MFP 1 requests a session-communication key to the management server 2. In response to the request, the management server 2 transmits the session-communication key to the MFP 1. Such transmission may be encrypted with a default-setting communication key in a manner similar to the above-described steps Sll and S12 illustrated in FIG. 7.

Next, at S53 the MFP 1 transmits a request signal for searching for a machine-specific ID to the management server 2. A machine-specific ID of the MFP 1 is attached to the request signal for searching for a machine-specific ID.

Receiving the request signal, the management server 2 searches the firmware-version DB 28 and transmits a search-result report at S54. The search-result report indicates whether or not the requested machine-specific ID has been found in the firmware-version DB 28, and is encrypted with the session-communication key.

If the MFP 1 receives from the management server 2 a search-result report that the machine-specific ID of the MFP 1 has been found, at S55 the MFP 1 transmits a firmware-comparison request signal. The machine-specific ID of the MFP 1 and the version information of firmware installed in the non-volatile memory 13 at the time are attached to the firmware-comparison request signal and encrypted with the session-communication key.

Receiving the firmware-comparison request signal, the management server 2 refers to the firmware-version DB 29 using the received machine-specific ID and determines whether or not the version information stored in the firmware-version DB 29 matches the received version information. Further, the management server 2 encrypts a determination result with the session-communication key and transmits the encrypted determination result to the MFP 1 to store the encrypted determination result on the HDD 14. Accordingly, if the version information stored in the firmware-version DB 29 matches the received version information, the MFP 1 determines that no unauthorized modification has been performed on the firmware. By contrast, if the version information stored in the firmware-version DB 29 differs from the received version information, the MFP 1 determines that unauthorized modification has been performed on the firmware.

As described above, version information of installed firmware is stored in the management server 2 before shipment of the MFP 1, and at setup the MFP 1 queries the management server 2 and the management server 2 compares version information. Such a configuration can more reliably detect unauthorized modification compared with a conventional method in which such detection of unauthorized modification is performed only in the MFP 1.

Next, restoration of the device-encryption key is described. Conventionally, a device-encryption key is stored in a secondary storage device, for example, a HDD, as a device-encryption-key BLOB. Accordingly, if a controller board malfunctions, the device-encryption key cannot be decrypted from the device-encryption-key BLOB, preventing access to encrypted data stored in the secondary storage device. Hence, according to the present illustrative embodiment, since such a device-encryption key is stored in the device-key DB 29 of the management server 2, the MFP can obtain the device-encryption key from the management server 2 to access to encrypted data stored in the HDD 14.

Figure 18:
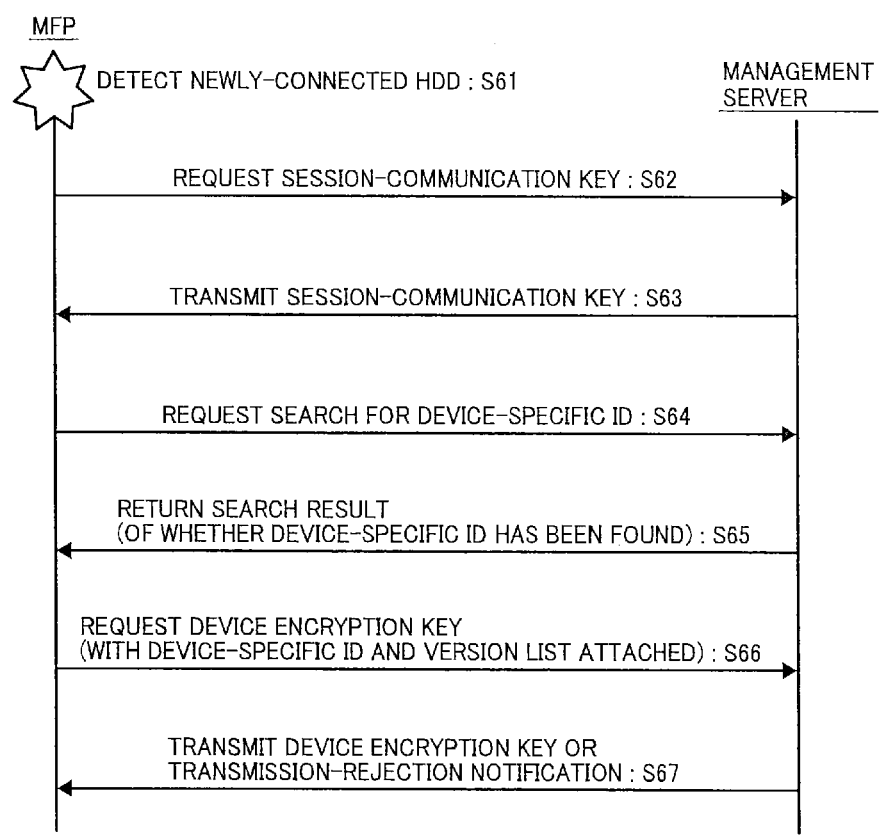
FIG. 18 is a sequence diagram illustrating an example of processing for restoring a device-encryption key.

Below, such a process is described with reference to a sequence diagram illustrated in FIG. 18. The process illustrated in FIG. 18 is executed, for example, when the controller board 11 of the MFP 1 malfunctions, the HDD 14 of the MFP 1 is mounted on a second MFP, and the second MFP is booted.

If the device-specific ID of the HDD 14 recognized by the second MFP 1 differs from a previously recognized ID, at S61 the second MFP 1 detects that a new HDD is connected to the second MFP 1.

Steps S62 and S63 are performed similarly to the above-described steps S51 and S52 illustrated in FIG. 17. At S64, the second MFP 1 transmits to the management server 2 a request signal for searching for a device-specific ID encrypted with a session-communication key. The request signal comes with the device-specific ID of the HDD 14 attached.

Receiving the request signal, the management server 2 searches the device-key DB 29 and transmits a search-result report to the second MFP 1 at S65. The search-result report indicates whether or not the requested device-specific ID has been found in the device-key DB 29, and is encrypted with the session-communication key.

If the MFP 1 receives from the management server 2 a report that the requested device-specific ID has been found, at S66 the MFP 1 transmits a device-key request signal. The device-key request signal comes with a machine-specific ID and a passphrase of the MFP 1 attached and is encrypted with the session-communication key.

Receiving the request signal for the device-encryption key, the management server 2 refers to the device-key DB 29 using the received machine-specific ID to compare the passphrase stored in the device-key DB 29 with the received passphrase. If the passphrase stored in the device-key DB 29 matches the received passphrase, the management server 2 encrypts the device-encryption key with the session-communication key and transmits the encrypted device-encryption key to the MFP 1 at S67. The MFP 1 uses the transmitted device-encryption key to decrypt the data loaded from the HDD 14. By contrast, if the passphrase stored in the device-key DB 29 differs from the received passphrase, the management server 2 encrypts a transmission-rejection report with the session-communication key and transmits the encrypted transmission-rejection report to the MFP 1 at S67.

The above-described process allows the device-encryption key of the HDD 14 to be restored when the HDD 14 is mounted on another MFP. Alternatively, when the controller board 11 is replaced with another controller board, the device-encryption key can be restored in a process similar to the above-described process.

As described above, in one illustrative embodiment, a machine management method includes installing software in a machine, such as the MFP 1, including a security device, such as the TPM 20, that holds a secret key unextractable from the security device and a public key extractable from the security device, encrypts input data with the public key, and decrypts the input data with the secret key; storing machine identification information of the machine in association with software identification information of the software installed in the machine in an external management apparatus, such as the management server 2; creating a device-encryption key to encrypt data stored on a first storage device, such as the HDD 14, of the machine; storing a device-encryption-key BLOB obtained by encrypting the device-encryption key with the public key on a second storage device, such as the non-volatile memory 13, of the machine; and storing the device-encryption key in association with the machine identification information in the external management apparatus.

In another illustrative embodiment, a machine management apparatus, such as the management server 2, manages software installed in a machine, such as the MFP 1, and a device-encryption key to encrypt data stored on a first storage device, such as the HDD 14, of the machine. The machine includes a security device, such as the TPM 20, that holds a secret key unextractable from the security device and a public key extractable from the security device, encrypts input data with the public key, and decrypts the input data with the secret key. The management apparatus includes a storage device, such as the HDD 27, to store machine identification information of the machine in association with software identification information of the software when the software is installed in the machine and the device-encryption key in association with the machine identification information when the device-encryption key is created.

In still another illustrative embodiment, a machine, such as the MFP 1, includes a first storage device, such as the HDD 14, to store data and a security device, such as the TPM 20, that holds a secret key unextractable from the security device and a public key extractable from the security device, encrypts input data with the public key, and decrypts the input data with the secret key. The machine further includes a transmission device, such as the controller board 11, to transmit machine-specific identification information in association with software identification information of software to an external management apparatus, such as the management server 2, when the software is installed into the machine, a second storage device, such as the non-volatile memory 13, to store a device-encryption BLOB obtained by encrypting a device-encryption key for encrypting data stored on the first storage device with the public key. The transmission device transmits the device-encryption key in association with device identification information of the first storage device to the external management apparatus to store the device-encryption key in association with the device identification information in the external management apparatus.

As described above, when software is installed in a machine such as the MFP 1, machine-specific ID information of the machine and software identification information of the installed software are associated and stored in an external management apparatus, such as the management server 2. When a device-encryption key is created, the device-encryption key is encrypted with a public key extractable from a security device, such as the TPM 20, to create a device-encryption-key BLOB. The device-encryption-key BLOB is stored on an internal secondary storage device, such as the non-volatile memory 13, of the machine. In addition, the device-encryption key is associated with the machine-specific identification information and stored in the external management apparatus. Thus, by comparing the software identification information of the software installed in the machine and the software identification information stored in the management apparatus, whether unauthorized modification has been performed on the software is detected. Further, even if the security device malfunctions and prevents decryption of the device-encryption key in the machine, the device-encryption key stored in the management apparatus can be used to decrypt the device-encryption key.

Such a configuration allows detection of unauthorized modification of software installed in a machine and management of a device-encryption key for encrypting data stored on a storage device of the machine.

Numerous additional modifications and variations are possible in light of the above teachings. It is therefore to be understood that, within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the scope of the present invention, and all such modifications are intended to be included within the scope of the present invention.

Further, elements and/or features of different illustrative embodiments may be combined with each other and/or substituted for each other within the scope of this disclosure and the appended claims, which are to be given the broadest interpretation consistent with this disclosure.

For example, any one of the above-described and other methods of the present invention may be embodied in the form of instruction codes stored in any kind of storage medium. Examples of storage mediums include, but are not limited to, flexible disk, hard disk, optical discs, magneto-optical discs, magnetic tapes, nonvolatile memory cards, ROM (read-only-memory), etc.

For example, such a storage medium may include instruction codes causing a machine management apparatus, such as the management server 2, to execute a machine management method. The method includes installing software in a machine, such as the MFP 1, including a security device, such as the TPM 20, that holds a secret key unextractable from the security device and a public key extractable from the security device, encrypts input data with the public key, and decrypts the input data with the secret key; storing machine identification information of the machine in association with software identification information of the software; creating a device-encryption key to encrypt data stored on a first storage device, such as the HDD 14, of the machine; and storing the device-encryption key in association with the machine identification information. Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. A management apparatus, comprising:
    a memory storing, after installation of software in a machine, first software identification of the software installed in the machine, wherein the memory further stores machine identification information of the machine in association with the first software identification information of the software installed in the machine; and
    a processor configured to compare second software identification information of the software installed in the machine with the first software identification information stored in the memory, and to determine whether unauthorized modification has been performed on the software installed in the machine based on results of the comparing, wherein the processor is further configured to:
search for the machine identification information stored in the management apparatus in response to a request received from the machine;
transmit to the machine, a reply indicating results of the search for the machine identification information;
receive, from the machine, the second software identification information of the software installed in the machine when the reply transmitted to the machine indicates that the machine identification information is found in the management apparatus; and
compare the second software identification information received from the machine with the first software identification information stored in the management apparatus.

2. The management apparatus according to claim 1, wherein the machine identification information comprises an encryption key.

3. The management apparatus according to claim 1, wherein the first software identification information comprises version information of the software.

4. An apparatus, comprising:
a memory configured to store installed software;
a processor configured to install the software in the apparatus, to transmit, to a management apparatus, a request for searching for machine identification stored in the management apparatus, and to transmit software identification information of the installed software to the management apparatus when a reply received from the management apparatus indicates that the machine identification information is found in the management apparatus.

* * * * *